G. GRAHAM.
BALL GLOBE VALVE.
APPLICATION FILED SEPT. 2, 1915.

1,182,166.

Patented May 9, 1916.

Witnesses
Arthur F. Draper
Chas. W. Stauffiger

Inventor
George Graham
By
Attorneys

UNITED STATES PATENT OFFICE.

GEORGE GRAHAM, OF DETROIT, MICHIGAN.

BALL GLOBE-VALVE.

1,182,166. Specification of Letters Patent. Patented May 9, 1916.

Application filed September 2, 1915. Serial No. 48,615.

*To all whom it may concern:*

Be it known that I, GEORGE GRAHAM, a citizen of the United States of America, residing at Detroit, in the county of Wayne and State of Michigan, have invented certain new and useful Improvements in Ball Globe-Valves, of which the following is a specification, reference being had therein to the accompanying drawings.

This invention relates to ball globe valves and the primary object of my invention is to furnish a valve of the above type with positive and reliable means, in a manner as hereinafter set forth, for sealing the connection between the bonnet of a valve and the ball cage, when the valve is opened, thus avoiding any leakage. To accomplish this object the bonnet of the valve is shaped to afford a seat for the top of a ball cage, the top of the ball cage being shaped to conform to a conical closure which will coöperate with the stem of the valve to provide a non-leakable connection.

A further object of this invention is to furnish a valve of the above type with a novel cage and renewable seats for a spherical or ball valve may freely revolve and present evenly worn surfaces to the seats for said valve. The ball cage is constructed to liberate any grit or foreign matter that may enter the same and in consequence of the novel construction of the cage, the longevity of the valve is materially increased and repairs reduced to a minimum.

From a practical and commercial standpoint, the parts of the valve are constructed with a view of reducing the cost of manufacture and at the same time retain the features by which durability, simplicity and ease of assembling are secured, and with such ends in view my invention resides in the novel construction to be hereinafter specifically described and then claimed.

Figure 1:
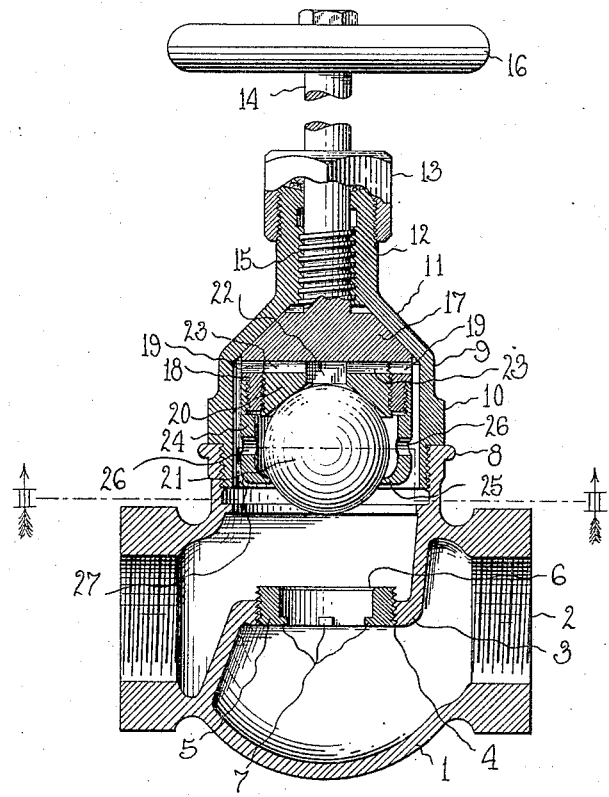
Figure 2:
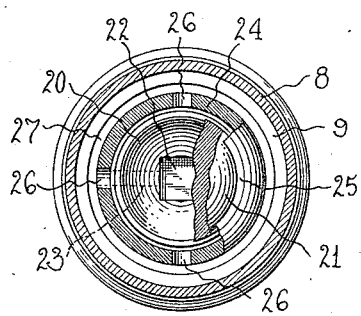

Reference will now be had to the drawings, wherein—Figure 1 is a vertical sectional view of the valve, partly broken away, and Fig. 2 is a horizontal sectional view taken on the line II—II of Fig. 1, looking in the direction of the arrows of said figure.

The ball check valve comprises a globular body 1 having the usual open interiorly screwthreaded ends 2 adapted for pipe connections. The valve body 1 also has the usual horizontal partition 3 provided with an opening 4, and part of my invention resides in screwthreading the walls of this opening and detachably mounting a collar 5 therein, said collar providing a ball valve seat 6. To facilitate mounting the collar in the partition 3, the bore or inner walls of the collar have lugs 7 which may be engaged by a suitable spanner wrench.

Intermediate the ends of the globular valve body 1 is a connection 8 for a bonnet 9 having a nut portion 10, a conical portion 11, and a stem portion 12. The stem portion 12 terminates in a stuffing box 13 of the ordinary and well known type for a valve stem 14, which has a threaded portion 15 in screwthreaded engagement with the stem portion 12 of the bonnet. On the outer end of the stem 14 is a conventional form of hand wheel 16 and on the inner end of the stem is a conical closure 17 adapted to seat against the conical portion 11 of the bonnet and seal the stem portion 12 of the bonnet relative to the remainder of the valve body. The conical closure 17 has an annular flange 18 interiorly screwthreaded and provided with diametrically opposed openings 19. Screwed into the flange 18 is an auxiliary seat member 20 for a spherical or ball valve 21, and said auxiliary seat member has a central rectangular opening 22 adapted to receive a wrench which will facilitate placing the auxiliary seat member in engagement with the conical closure. The auxiliary seat member 20 has diametrically opposed openings 23 adapted to register with the openings 19 of the flange 18 and thereby provide opposed passages establishing communication between the interior of the bonnet and the seat of the auxiliary member 20. The flange 18 is reduced and exteriorly screwthreaded to receive an annular cage 24 which has the lower end thereof peened or inturned, as at 25, to support the spherical or ball valve 21. The walls of the cage 24 are apertured, as at 26, and said cage is of less diameter than the bonnet 9 in order to establish an annular passage 27 at the outer side of the cage, said passage establishing communication between the openings 19 and the connection 8 of the valve body 1.

The ball valve 21 has play or movement in its cage to revolve and present an even and smooth surface to the valve seat 6, and in order that the ball valve may be positively held on its seat, against movement in its cage, it is necessary to use the auxiliary seat member 20. After the ball valve 21 impinges the seat 6 a further adjustment of the stem 14 carries the auxiliary seat member on to the ball valve, forcing said ball valve into snug engagement with the seat 6 to close the globular valve body 1 or shut off a supply of fluid. When the valve body is closed, the auxiliary seat member 20 bears upon the ball valve 21 and thereby provides a non-leakable connection between the ball valve and the collar 5. When in this position the cage 24 is lowered in the connection 8 and if the valve is associated with a stand pipe, sediment or foreign matter in the stand pipe has a tendency to settle in the cage and about the ball valve 21. The sediment often includes grit and such matter that is injurious to the seats of the ball valve, and it is with this fact in view, that the cage of the ball valve has been constructed whereby fluid may freely circulate through the same, when the valve is open, and thereby flush and wash out any grit that may accumulate in the cage. As the cage 24 is elevated the inrush of water or other fluid flushes the conical portion 11 and conical closure 17, besides entering the annular passage 27 and openings 19 and 23. The conical closure 17 and its seat are therefore maintained free of any sediment and the conical closure will tightly seal the upper portion of the cage and avoid leakage when the ball valve 21 is unseated. With the ball valve unseated it is impossible for grit or other matter to accumulate within the cage, as the water or fluid can freely circulate through the same.

Insomuch that the collar 5 and the auxiliary seat 20 are detachable, these two parts can be easily and quickly renewed, when worn, consequently the remainder of the valve may be indefinitely used.

What I claim is:—

1. The combination with a globular valve body provided with a valve seat, of a bonnet connected to said body and having a conical portion and a stem portion, a valve stem in screwthreaded engagement with the stem portion of said bonnet, a conical closure carried by said stem adapted to seat against the conical portion of said bonnet, an annular flange carried by the conical closure of said stem, a cage connected to said flange, an auxiliary seat member detachably mounted in said flange, and a ball valve supported within said cage and adapted to engage the seat of said valve body and held thereon by said auxiliary seat member.

2. A ball check valve comprising a globular valve body provided with a valve seat, a bonnet connected thereto having a conical portion and a stem portion, a valve stem in screwthreaded engagement with the stem portion of said bonnet, a conical closure carried by said stem and adapted to seat against the conical portion of said bonnet, an annular flange carried by said conical closure and provided with openings, an auxiliary seat member detachably mounted in said flange and having openings registering with the openings of said flange, an apertured cage of less diameter than said bonnet and detachably connected to said flange, and a ball valve supported by said cage and adapted to engage the seat of said valve body and be held thereon by said auxiliary seat member to close said valve body.

In testimony whereof I affix my signature in presence of two witnesses.

GEORGE GRAHAM.

Witnesses:
KARL H. BUTLER,
ANNA M. DORR.

Copies of this patent may be obtained for five cents each, by addressing the "Commissioner of Patents, Washington, D. C."